United States Patent
Henry et al.

(10) Patent No.: US 7,546,385 B1
(45) Date of Patent: *Jun. 9, 2009

(54) NETWORK ACCESS DEVICE HAVING INTERNETWORKING DRIVER WITH ACTIVE CONTROL

(75) Inventors: Paul Shala Henry, Holmdel, NJ (US); Meng-Ju Lin, Taichung (TW); Hui Luo, Marlboro, NJ (US)

(73) Assignee: AT&T Corp., New York, NY (US)

( * ) Notice: Subject to any disclaimer, the term of this patent is extended or adjusted under 35 U.S.C. 154(b) by 480 days.

This patent is subject to a terminal disclaimer.

(21) Appl. No.: 11/216,794

(22) Filed: Aug. 31, 2005

Related U.S. Application Data

(63) Continuation of application No. 10/138,099, filed on May 2, 2002, now Pat. No. 7,028,104.

(51) Int. Cl.
*G06F 15/16* (2006.01)
*H04J 3/16* (2006.01)
*H04J 3/22* (2006.01)
*G06F 15/177* (2006.01)

(52) U.S. Cl. .............. 709/250; 709/220; 709/230; 370/466

(58) Field of Classification Search .............. 709/220, 709/250, 230, 226, 229, 249; 370/466; 719/315
See application file for complete search history.

(56) References Cited

U.S. PATENT DOCUMENTS

| 6,028,848 | A | * | 2/2000 | Bhatia et al. | 370/257 |
| 6,088,749 | A | * | 7/2000 | Hebert et al. | 710/105 |
| 6,687,245 | B2 | * | 2/2004 | Fangman et al. | 370/356 |
| 2003/0165160 | A1 | * | 9/2003 | Minami et al. | 370/466 |
| 2003/0177396 | A1 | * | 9/2003 | Bartlett et al. | 713/201 |
| 2004/0023653 | A1 | * | 2/2004 | O'Neill | 455/432.1 |

* cited by examiner

*Primary Examiner*—Jason Cardone
*Assistant Examiner*—Brian J Gillis

(57) ABSTRACT

A network interface driver embodied in a processor readable medium comprising executable program instruction that, when executed by a processor, independently process internetworking protocols for a hot computer (or other network access device) with another computer on a remote network. The driver appears to the operating system as a regular network interface driver, but it can support enhanced kernel-level internetworking protocols by using a state machine to generate, drop, and change incoming and outgoing IP packets in a manner transparent to the operating system.

18 Claims, 12 Drawing Sheets

NETWORK ACCESS DEVICE HAVING INTERNETWORKING DRIVER WITH ACTIVE CONTROL

CROSS REFERENCE TO RELATED APPLICATIONS

The present application is a continuation to U.S. patent application Ser. No. 10/138,099 filed on May 2, 2002 now U.S. Pat. No. 7,028,104.

FIELD

The present embodiments relate to computer networking. The present embodiments relate network access devices having a network interface driver that supports new or improved internetworking functionality while maintaining backward compatibility with the overlying Internet Protocol (IP) stack of the computer operating system, thereby enabling independent software developers to upgrade kernel-level internetworking functions without the need to rely upon operating system vendors.

BACKGROUND

Adding new (or improve legacy) kernel-level internetworking functions, such as IP mobility support, on computers using software-based solutions is very difficult. Typically modifications to the IP stack that are built into an operating system, are required; a task that cannot be easily accomplished by independent software developers.

In the networking environment, data packets are dispatched across network connections by employing software drivers that control hardware modules. An operating system, such as, for example Microsoft Windows@, requires that drivers be programmed as passive, instantly responsive routines for the purpose of device 110. A driver does not have active control; it always waits to be called by the operating system. Accordingly, in response to a call, the driver will rapidly complete the specified 110 operation and return control back to the operating system as quickly as possible. If the underlying physical device cannot finish the 110 operation within a specified period of time, the driver will typically start the physical device, instruct the physical device to generate a hardware interrupt to notify the operating system after the 110 operation has finished, and immediately return control back to the operating system with a pending status.

A need exists for a network interface driver to support new (or improve legacy) internetworking protocols, a task that was previously addressed at the IP layer or above. Many internetworking protocols that are based on a client-server model require the client (and often the server) to have active, persistent control in order to manage signaling over a network connection. The signaling must account for transmission time over the network and unexpected breaks that can occur in the network connection. If a network interface driver is used to support internetworking protocols, the requirement for active, persistent control conflicts with the fundamental characteristics of a driver such as passiveness and instant response.

The present embodiments meet these needs.

SUMMARY

The present embodiments relate to network interface drivers that "independently" support internetworking protocols. In this regard, "independently" means that the driver does not require assistance from the operating system or any application program to implement the driver's functionality.

The present embodiments provide generic methods to solve the problems in the prior art by incorporating state machines into network interface drivers to support new (or improved) functions and to keep backward compatibility with the overlying IP stack of the operating system.

The present embodiments provide special programming methods for network interface drivers. The present embodiments can be implemented as an intermediate driver independent of the underlying network hardware. The present embodiments can be implemented in a network interface driver dedicated to support some type of network hardware. In either case, the internetworking driver is commonly referred to as an "iDriver" hereinafter. As compared to regular network interface drivers that are only responsible for carrying out local network 110 functions for the operating system, an iDriver in accordance with the invention can provide enhanced kernel-level internetworking functions that are not supported by the built-in IP stack of the operating system. In this regard, the iDriver appears to the operating system as a regular network interface driver, but it can support enhanced kernel-level internetworking protocols by using a state machine to generate, drop, and change incoming and outgoing IP packets in a manner transparent to the operating system.

The iDriver need not be physically associated with a computer. In addition to use with network interface drivers, the iDriver can also be utilized with other 110 devices that are distributed on the Internet (i.e., a remote camera).

The iDriver: (1) enables independent software developers to upgrade kernel-level internetworking functions for networked computers without relying on operating system vendors; (2) allows independent software developers to distribute upgrades as standalone software products because these upgrades are implemented as network interface drivers that are not part of an operating system; and (3) assures compatibility between any upgrades and the operating system because such upgrades are based on standard network driver programming interfaces specified by the operating system. This software solution to many kernel-level internetworking problems previously required changes to be made to the built-in IP stack of the computer's operating system.

In accordance with the present embodiments, a network interface driver is provided embodied in a processor readable medium comprising executable program instructions that, when executed by a processor, independently process internetworking protocols for a host computer with another computer on a remote network. The program instructions incorporate a state machine having a plurality of states, each state associated with a plurality of threads and waited events for performing a method on a processor, comprising the steps of processing outgoing packets from an operating system associated with a host computer, in at least one of the plurality of states; processing incoming packets to an access network, in at least one of the plurality of states; and processing at least one of a plurality of time-out events in at least one of the plurality of states. The processing steps are all instant actions, comprising: generating a new packet and sending it to the operating system or the access network, dropping a packet received from the operating system or the access network, revising the content of a received packet and then sending it to the operating system or the access network, registering a time-out event with the operating system, and changing the state of the driver.

In accordance with another aspect of the embodiments, a network access device includes a network interface driver embodied in a processor readable medium comprising executable program instructions that, when executed by a processor, independently process internetworking protocols for the network access device with another device on a remote network.

BRIEF DESCRIPTION OF THE DRAWINGS

The detailed description will be better understood in conjunction with the accompanying drawings as follows.

Figure 1:
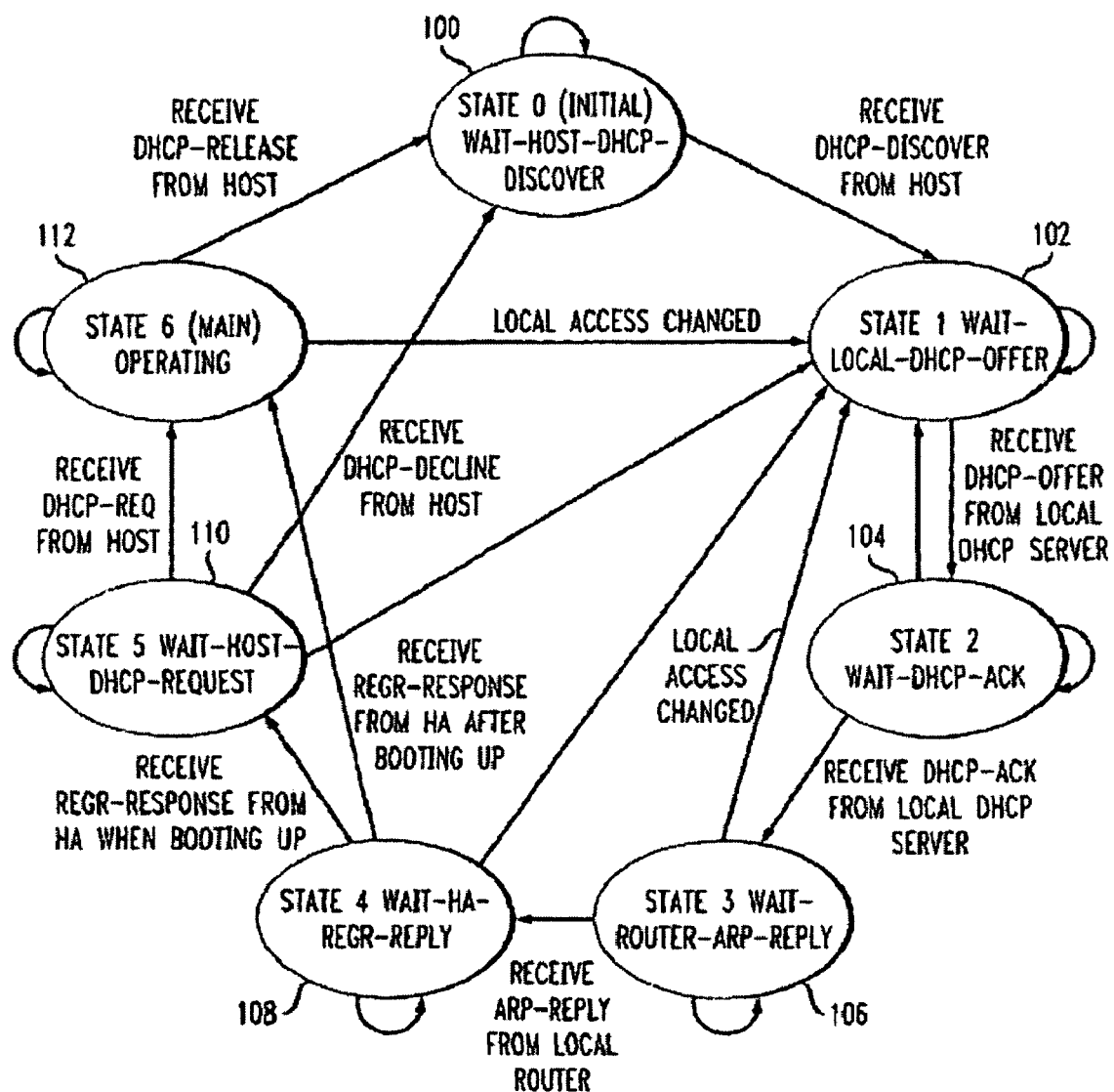
FIG. 1 is a state transition table for an exemplary iDriver that implement mobility management functions using DHCP and Mobile IP with a remote Home Agent.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

With reference now to the several views of the drawings, the present invention provides an internetworking driver installed on a host computer or network access device (not shown), incorporating a state machine with three standard threads: one processing incoming IP packets (hereinafter "the incoming thread"), one processing outgoing IP packets (the "outgoing thread"), and one processing time-out events (the "time-out thread"). The time-out thread associates with a system timer to obtain periodic control from the operating system, which, in effect, enables the iDriver to obtain active control from the operating system.

The other two tlu-eads are utilized to process incoming and outgoing IP packets as state-dependent 110 events, each of which can be processed instantly as part of a small step of internetworking signaling utilizing a specified protocol. The state machine may have optional threads to process particular hardware-specific events (such as the Association event for 802.11 WLAN interface cards). These threads can be programmed into NIC (network interface card) drivers, intermediate network drivers, or virtual network interface drivers.

A "server-type" iDriver can interact with multiple clients independently. In such an implementation, multiple state machines can be utilized.

The iDriver decomposes signaling into state-dependent I/O events that are capable of being processed instantly. An illustrative set of rules is described as follows:

(1) To support an enhanced internetworking protocol on behalf of the operating system, the iDriver acts as a proxy to edit all relevant protocols between the operating system and the network. The iDriver also implements the enhanced internetworking protocol between peers on the network and itself. The iDriver processes all relevant signaling with the operating system to keep the enhanced protocol transparent to and backward compatible with the operating system, and to make the network believe the operating system supports the enhanced protocol by itself. Accordingly, all signaling involving the iDriver can be characterized with a message flow chart that depicts the protocol message flow between the operating system and the iDriver, and the iDriver and any peers on the network. Where there is more than one paragraph in a signaling protocol, each can be described using a message flow chart. From all the message flow charts, one can identify the maximum number of states for the iDriver, which is equal to the number of types of protocol messages that the iDriver expects to receive from the network and from the operating system. These protocol messages are embodied in IP packets. If a protocol message must be carried by multiple IP packets, it should be broken into a series of protocol messages, each carried by an IP packet. A counter is associated with the state in which the iDriver is waiting for the entire protocol message.

(2) Among all signaling paragraphs, some can and some cannot occur concurrently. After identifying the maximum subset of non-concurrent signaling paragraphs, the actual number of states for the iDriver equals the number of protocol messages that the iDriver expects to receive from the operating system and from the network, if the iDriver engages only in signaling belonging to the subset.

(3) In each state, the iDriver is programmed as an event handler that can change its state. When an expected event occurs, a corresponding thread of the iDriver is called by the operating system. The iDriver then processes the event, changes the state if needed, and immediately returns control back to the operating system. Specifically, the iDriver defines a set of "waited events" and instant event handlers (callback functions) for every state. A waited event could be a specific incoming IP packet (which may represent an incoming protocol message), a specific outgoing IP packet (which may need to be edited by the iDriver in order to make the network believe the operating system support the protocol), or a specific time-out event (which may be registered by the iDriver to signal that an expected incoming protocol message has not arrived on time). An instant event handler only contains "instant actions" that can be finished immediately, such as reading from and writing variables to memory (including changing the state), registering a time-out event, dropping an incoming/outgoing IP packet, making an incoming/outgoing IP packet, editing an incoming/outgoing IP packet, and passing an original, made-up, or edited incoming/outgoing IP packet to the operating system/network interface card. When a prescribed event occurs, the thread responsible for processing this type of event is called by the operating system. A branch of the thread corresponding to the current state (every thread has multiple branches, each corresponding to a state) is executed and checks whether this event is a waited event in this state. If it is, the branch calls the corresponding instant event handler, then immediately returns. If the event is not a waited event for the state, the event is ignored and the thread returns immediately.

(4) A paragraph of a signaling protocol typically consists of one or more pairs of request and reply messages. There may be multiple reply messages responding to a request message. In this instance, all reply messages are considered to be the same type of protocol messages, which accordingly must be processed by different instant event handlers. A pair of request and reply messages, which cannot be finished instantly at the client side, can be decomposed into an instant action in the current state, a state transition, and a waited event in the next state. For example, assume the iDriver is in a first state, "State 1," when it sends out a request message. As soon as the request message is dispatched, the iDriver changes into "State 2," registers two time-out events (one for re-sending the request message and one for giving-up the conversation), and returns immediately. The reply message and the two time-out events are defined as waited events in State 2. If the re-sending time-out event occurs, the branch corresponding to State 2 in the time-out thread is executed. The iDriver re-sends the request message, registers a new re-send time-out event, and returns immediately. If the "giving-up" time-out event occurs, the branch corresponding to State 2 in the time-out thread is executed. It removes the re-sending time-out event registration, indicates a networking error to the overlying IP stack, changes the branch back to State 1 (or some initial state, depending on the protocol), and returns immediately. If the reply message arrives, the branch corresponding to State 2 in the incoming thread is executed. It removes both time-out event registrations, processes the reply message (such as sending out the next request message, registering two time-out events for the new reply message, changing into State 3, etc.), and returns immediately.

(5) The iDriver starts running in an initial state after some initialization event (e.g., an outgoing DI-ICP-Discover message sent by the operating system if the operating system uses DHCP to initialize the network interface). The iDriver blocks the network connection until the initialization event occurs. The iDriver can have "intelligence" in the initial state so that it can identify whether the operating system adopts DHCP, static IP address, or APIPA (Automatic Private IP Addressing) as its network interface configuration.

(6) The iDriver resides in a "common state" most of time in which it bridges incoming/outgoing IP data packets between the operating system and the network. It waits for an event to trigger the next round of signaling conversations. In this state, a client-type iDriver sends out the first request message. A server-type iDriver waits for the first request message sent by a client. It may be the destination state if a signaling conversation ended because the network connection has been severed or the peer does not respond accordingly. It can also be the state in which the iDriver polls information from the network. In an illustrative embodiment, the iDriver provides IP mobility support to a network access device, such as, for example, a laptop using Microsoft Windows@ with the NDIS (Network Device Interface Specification [1]) intermediate driver. The iDriver implements MH (Mobile Host) functions of Mobile IP [2] with security enhancement and routing optimization. It operates in conjunction with a remote HA (Home Agent) of the type well known in the art. These MH functions are transparent to the Windows@ operating system. In this regard, Windows views the iDriver as a regular NIC driver, and the iDriver supplies Windows@ with a fixed IP address (which belongs to the subnet where the HA is deployed). The iDriver implements the following tasks: (1) obtaining a care-of IP address from the local access network; (2) establishing an IP tunnel with the remote HA using the care-of IP address; (3) encapsulating outgoing IP packets and decapsulating incoming IP packets; and (4) monitoring the local access network and repeating the above steps if any change occurs (due, for example, to motion of the MH).

For the sake of simplicity, it is assumed that: (1) Windows@ runs DHCP to obtain an IP address (the iDriver can be configured so that it automatically identifies whether the Windows suns DHCP or adopts a static IP address based on the type of outgoing IP packets when the network interface is initialized); (2) every local access network runs DHCP to allocate IP addresses (it is possible that a local access network might not run DHCP to allocate IP addresses (the iDriver can be configured to identify the type of the local access network and adopt the appropriate method to apply for a care-of IP address); and (3) there is a high-entropy secret shared between the iDriver and HA, thus enabling the use of CHAP for authentication and a D-H key exchange algorithm [5] signed by a secret key to establish session keys. DHCP is known in the art and described in, for example, R. Droms, "Dynamic Host Configuration Protocol," IETF Network Working Group, RFC 2131 (March 1997); S. Alexander, R. Droms, "DHCP Options and BOOTP Vendor Extensions," IETF Network Working Group, RFC 2132 (March 1997); which are incorporated by reference herein. CHAP is described in, for example, W. Simpson, "PPP Challenge Handshake Authentication Protocol (CHAP)", IETF RFC 1994, August 1996, which is incorporated herein by reference. D-H key exchange algorithms are known as described in, for example, W. Diffie and M. E. Hellman, "New Directions in Cryptography", IEEE Trans. on Information Theory, vol. 22, no. 6, November 1976, pp/644-654, the content of which is incorporated herein by reference.

The foregoing is utilized with an iDriver configured as a Mobile IP client. The number of states for the iDriver are determined as described hereinafter. Under the assumption that Windows@ runs DHCP to initialize a network interface, the iDriver expects to receive DHCP-Discover, DHCP-Request, DHCP-Decline, and DHCP-Release messages from Windows@. Among these, DHCP-Request and DHCP-Decline are of the same type. These are two different replies that are responsive to each DHCP-Offer message. In connection with the Mobile IP functions implemented by the Mobile IP client, the iDriver expects to receive DHCP-Offer, DHCP-Ack, and DHCP-Nack messages from local DHCP servers, ARP-Reply messages from local gateway routers, and REGR-Reply messages from the HA. Of these, DHCP-Ack and DHCP-Nack are of the same type, because these are two different replies to the DHCP-Request message. In addition, the iDriver expects to receive IP data packets from Windows@ and the network. These data packets must be edited (i.e., encapsulation/decapsulation, and encryption/decryption). In total, there are nine types of protocol messages that the iDriver expects to receive from Windows@ and the network. Accordingly, the maximum number of states for the iDriver is 9 in accordance with Rule No. 1 described above. However, the signaling conversations for receiving IP data packets from Windows@ and the signaling conversations for receiving IP data packets from the network are concurrent with the other conversations (i.e., boot and handoff). Accordingly, the actual number of states is equal to seven, per Rule No. 2 above.

With reference to FIG. 1, an illustrative iDriver can be configured as a seven-state state machine with three threads: an incoming thread for processing incoming IP packets, an outgoing thread for processing outgoing IP packets, and one associated with a system timer that times out after a prescribed time expires (e.g., every 100 ms). The seven states are characterized as follows: (0) the Wait-Host-DHCP-Discover state (initial state) 100, (0) the Wait-Local-DHCP-Offer state (transient state) 102, (3) the Wait-Local-DHCP-Ack state (transient state) 104, (4) the Wait-Router-ARP-reply state (transient state) 106, (5) the Wait-HA-Registration-Reply state (transient state) 108, (6) the Wait-Host-DHCP-Request state (transient state) 110, and (7) the Operating state (common state) 112.

Figure 2:
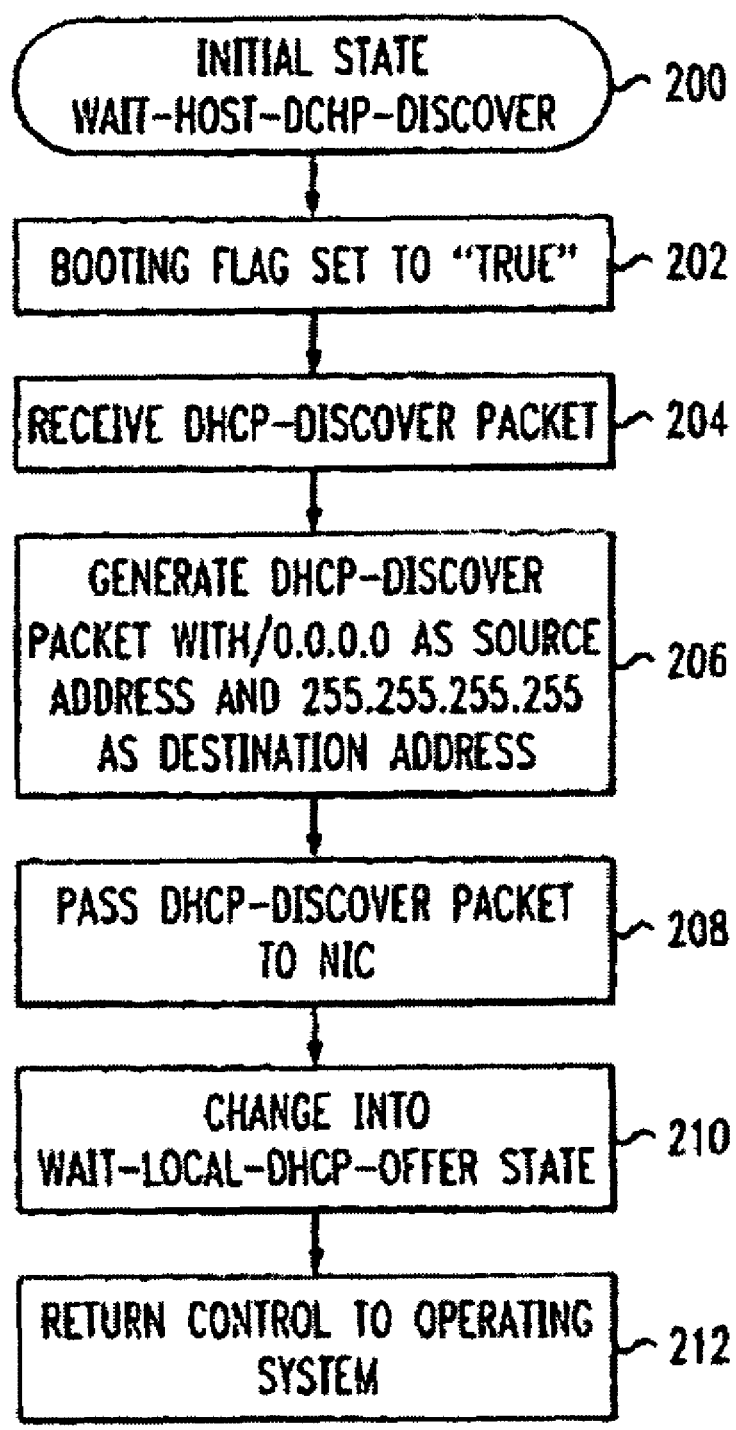
FIG. 2 is a flow diagram of a Wait-Host-DHCP-Discover state (initial state).

After the states have been identified, the waited events for each state and the instant actions for their instant event handlers are defined. With reference to FIG. 2, initially the iDriver resides in the Wait-Host-DHCP-Discover state at 200 with a Booting-Flag set to "True." The waited event in this state is an outgoing DHCP-Discover packet from Windows@. In response to a DHCP-Discover packet received from WindowsO at 204 (i.e., the thread processing outgoing IP packets is called by Windows), the iDriver generates a DHCP-Discover packet with 0.0.0.0 as the source IP address and 255.255.255.255 as the destination IP address at 206, and passes the DHCP-Discover packet to the underlying NIC driver at 208. The NIC driver broadcasts the DHCP-Discover packet on the local access network. The iDriver then changes into the Wait-Local-DHCP-Offer state at 208, and the outgoing thread returns control to WindowsO at 212.

Figure 3:
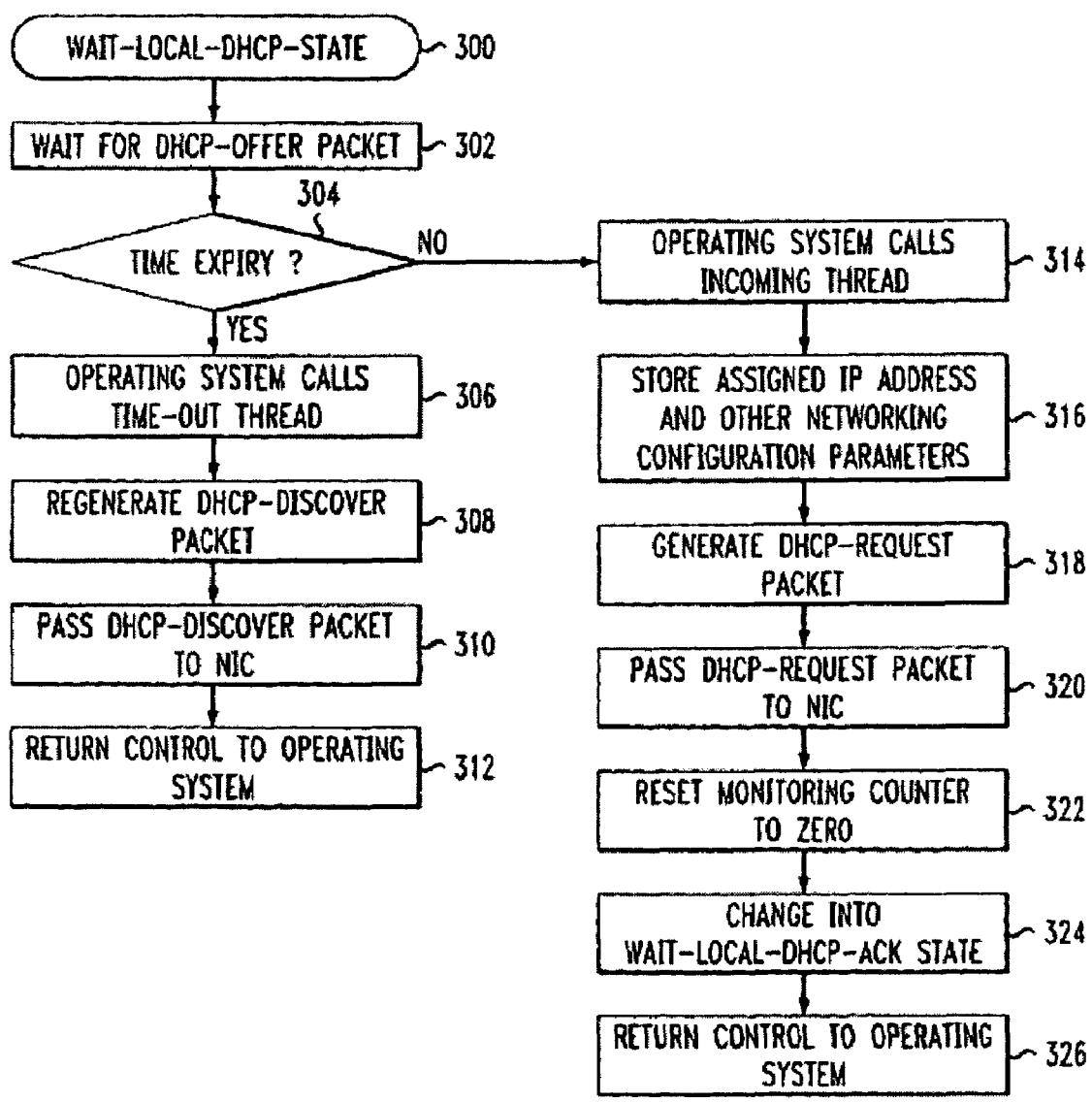
FIG. 3 is a flow diagram of a Wait-Local-DHCP-Offer state (transient state).

Referring now to FIG. 3, in the Wait-Local-DHCP-Offer state identified at 300, the iDriver waits for a DHCP server on the local access network to send back a DHCP-Offer packet at 302 in response to the DHCP-Discover packet received from the MH. If the associated system timer times out in this state at 304 (which means the iDriver has not received the expected DHCP-Offer packet within 100 ms), Windows@ calls the time-out thread at 306. The time out thread carries out the following instant actions: (1) regeneration of the DHCP-Discover packet at 308; and (2) passage of the DHCP-Discover packet to the underlying NIC driver at 310. The NIC driver rebroadcasts the DHCP-Discover packet on the local access network. The time-out thread then returns control back to Windows@ at 312. After a DHCP-Offer packet is received from the local access network in this state, Windows@ calls the incoming thread at 314. The incoming thread then carries out the following instant actions: (1) storing the assigned IP address (as the care-of IP address) and other networking configuration parameters (including the default gateway router's IP address) in the MH's memory at 316; (2) generating a DHCP-Request packet with the care-of IP address as the source IP address at 318; (3) passing the DHCP-Request packet to the underlying NIC driver at 320, which in turn forwards this DHCP-Request packet to the DHCP server, (4) resetting the Monitoring-Counter to zero at 322; and (5) changing into the Wait-Local-DHCP-Ack state at 324. The incoming thread then returns control back to Windows@ at 326.

Figure 4:
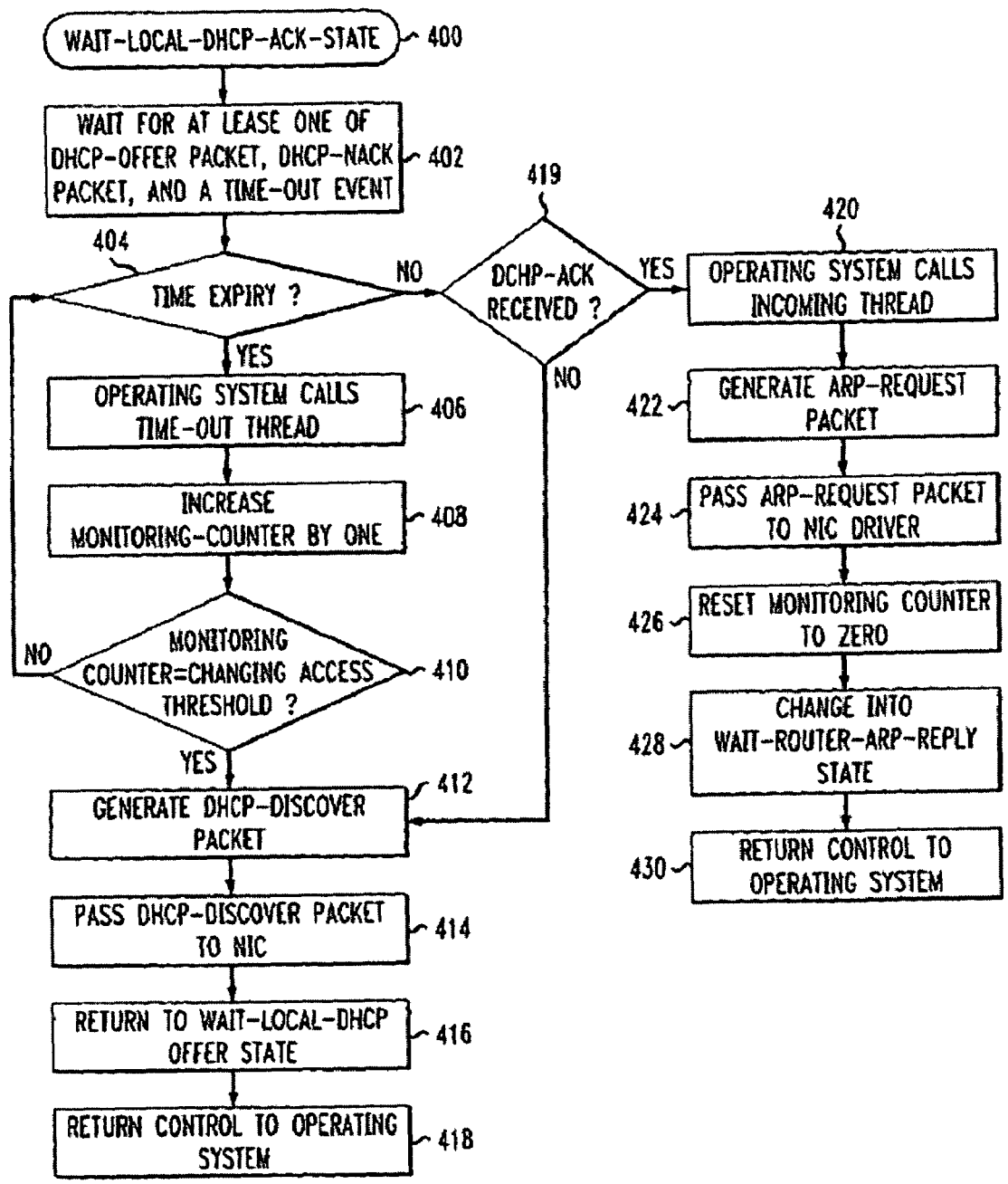
FIG. 4 is a flow diagram of a Wait-Local-DHCP-Ack state (transient state).

Referring now to FIG. 4, in the Wait-Local-DHCP-Ack state identified at 400, the iDriver waits for a DHCP server on the local access network to reply with a DHCP-Ack packet or DHCP-Nack packet in response to the DHCP-Request packet. In the interim, the iDriver monitors the local access network based on the value of the Monitoring Counter. The waited events in this state include an incoming DHCP-Ack packet, an incoming DHCP-Nack packet, and a time out event at 402. If the associated system timer times out in this state at 404 (which means the iDriver has not received the expected DHCP-Ack or DHCP-Nack within looms), Windows@ calls the time-out thread at 406. The time-out thread then implements a series of actions. First, the Monitoring Counter is increased by one at 408. If the Monitoring-Counter equals a Changing-Access-Threshold (i.e., where the MH may have moved to another access network) at 410, the iDriver generates a DHCP-Discover packet at 412 with 0.0.0.0 as the source IP address and 255.255.255.255 as the destination IP address. This packet is passed to the underlying NIC driver at 414, which in turn broadcasts the DHCP-Discover packet on the local access network. The iDriver then changes back into the Wait-Local-DHCP-Offer state at 416, and returns control back to WindowsB at 418. If a DHCP-Ack packet is received at 419 from the local access network in this state, WindowsB calls the time-out thread at 420 and the iDriver generates an ARP-Request [6] packet with the care-of IP address as the source IP address at 422. An ARP-Request packet with a care-of IP address as the source IP address is disclosed in D. C. Plummer, "Ethernet Address Resolution Protocol: Or converting network protocol addresses to 48.bit Ethernet address for transmission on Ethernet hardware", IETF STD37 (RFC826), November 1982, the content of which is incorporated by reference herein. The iDriver then passes the ARP-Request packet to the underlying NIC driver at 424, which in turn broadcasts the ARP-Request packet on the local access network to resolve the MAC address of the default gateway router. The iDriver "knows" the IP address of the default gateway router from the previously received DHCP-Offer packet. The Monitoring-Counter is then reset to zero at 426. The iDriver changes into the Wait-Router-ARP-Reply state at 428, and the incoming thread returns control back to Windows@ at 430. If a DHCP-Nack packet is received from the local access network in this state at 419, the incoming-thread regenerates a DHCP-Discover packet at 412 with 0.0.0.0 as the source IP address and 255.255.255.255 as the destination IP address and implements the subsequent steps described above.

Figure 5:
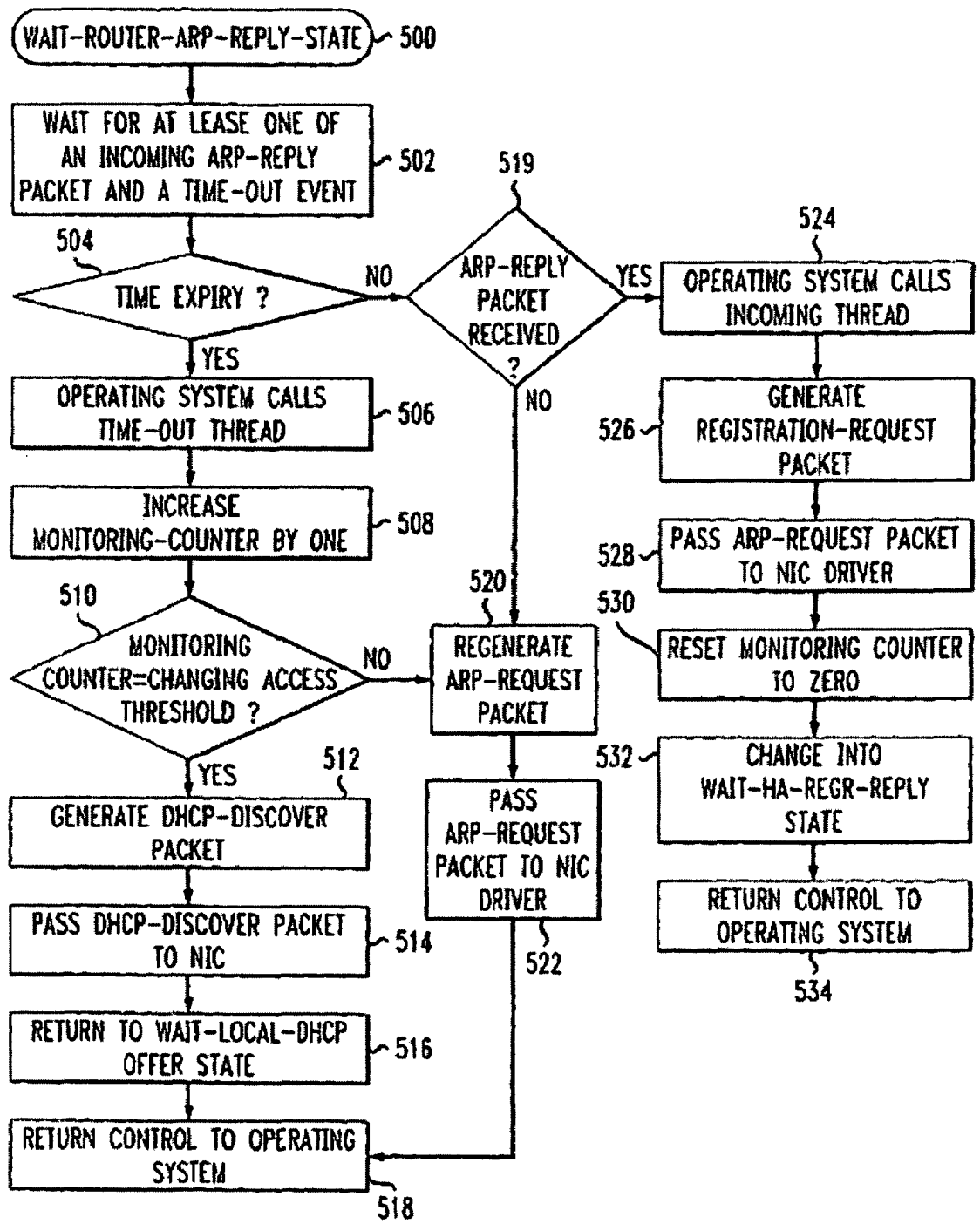
FIG. 5 is a flow diagram of a Wait-Router-ARP-reply state (transient state).

Referring now to FIG. 5, in the Wait-Router-ARP-Reply state identified at 500, the iDriver waits for the default gateway router on the local access network to send back its MAC address in response to the ARP-Request packet from the MH. In the interim, the iDriver monitors the local access network based on the value of the Monitoring-Counter. The waited events in this state include an incoming ARP-Reply packet and a time-out event at 502. If the associated system timer times out in this state at 504 (which means the iDrives has not received any ARP-Reply packet within 100 ms), Windows03 calls the time-out thread at 506. The time-out thread then carries out the following instant actions. First, the Monitor-Counter is increased by one at 508. If the Monitoring-Counter equals a Changing-Access-Threshold at 510 (which means the MH may have moved into another local access network), the iDriver generates a DHCP-Discover packet at 512 with 0.0.0.0 as the source IP address and 255.255.255.255 as the destination IP address, and passes it to the underlying NIC driver at 514. The NIC driver broadcasts this packet on the local access network. The iDriver then enters the Wait-Local-DHCP-Offer state at 516. If the Monitoring-Counter does not equal the Changing-Access-Threshold, the iDriver regenerates the ARP-Request packet at 520 and passes it to the underlying NIC driver at 522. The NIC driver sends the packet to the local access network in order to resolve the MAC address of the default gateway router. The time-out thread then returns control back to @ at 518. If an ARP-Reply packet is received from the local access network in this state at 519, Windows@ calls the incoming thread at 524, which generates a Registration-Request packet at 526 with the care-of IP address as the source IP address and the HA's IP address as the destination IP address and passes it to the underlying NIC driver at 528. The NIC driver sends the Registration-Request packet to the default gateway router using the router's MAC address as the destination MAC address. The iDriver then resets the Monitoring-Counter to zero at 530, and changes into the Wait-HA-REGR-Reply state at 532. The incoming thread then returns control back to Windows@ at 534. The Registration-Request packet includes a MH ID, an Authentication-Challenge message, and a Key-Exchange-Request message. In the Authentication-Challenge message, a nonce is presented to challenge the HA. In the Key-Exchange-Request message, another nonce is presented to initiate the session key establishment process.

Figure 6:
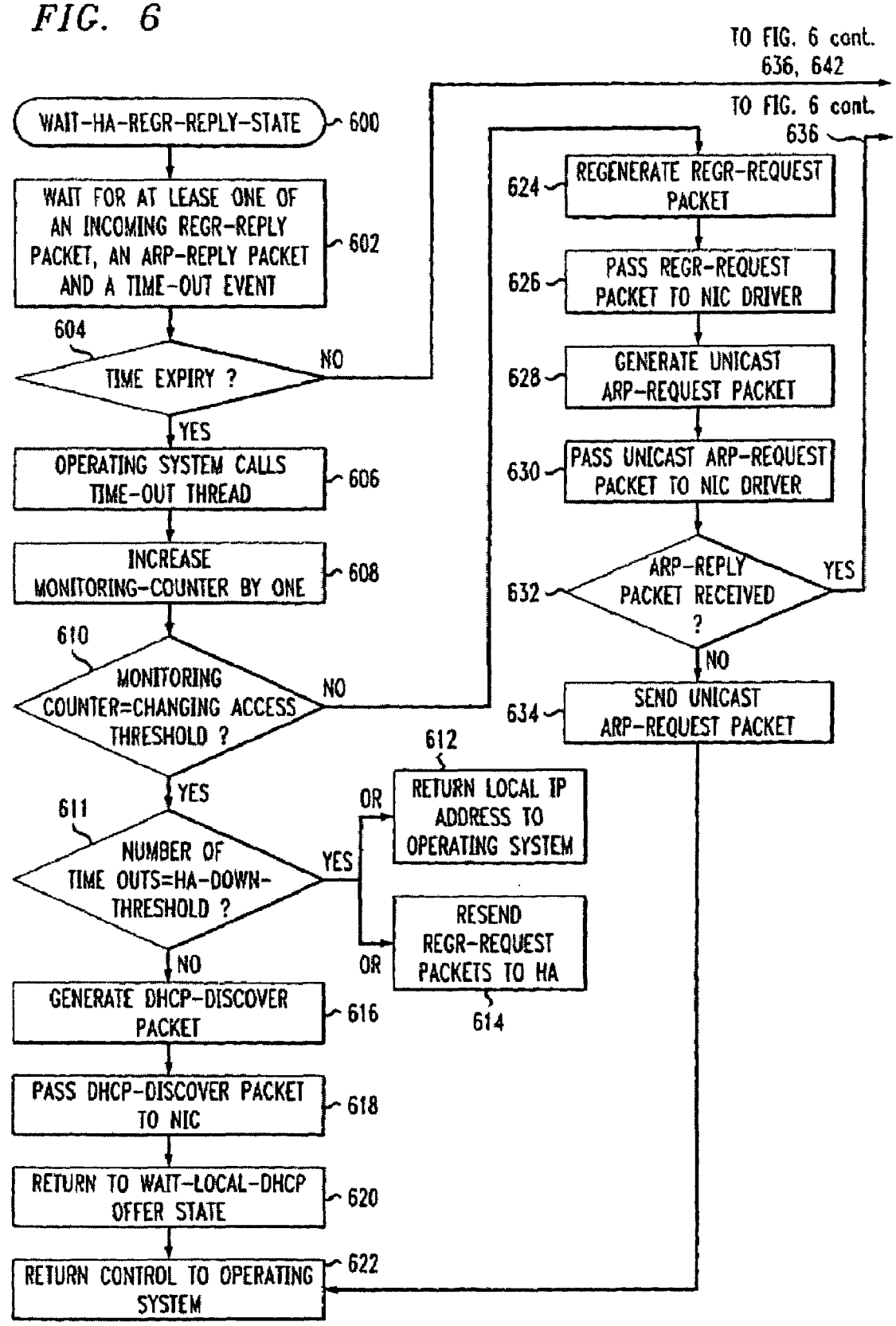
FIG. 6 is a flow diagram of a Wait-HA-Registration-Reply state (transient state).
Figure 6:
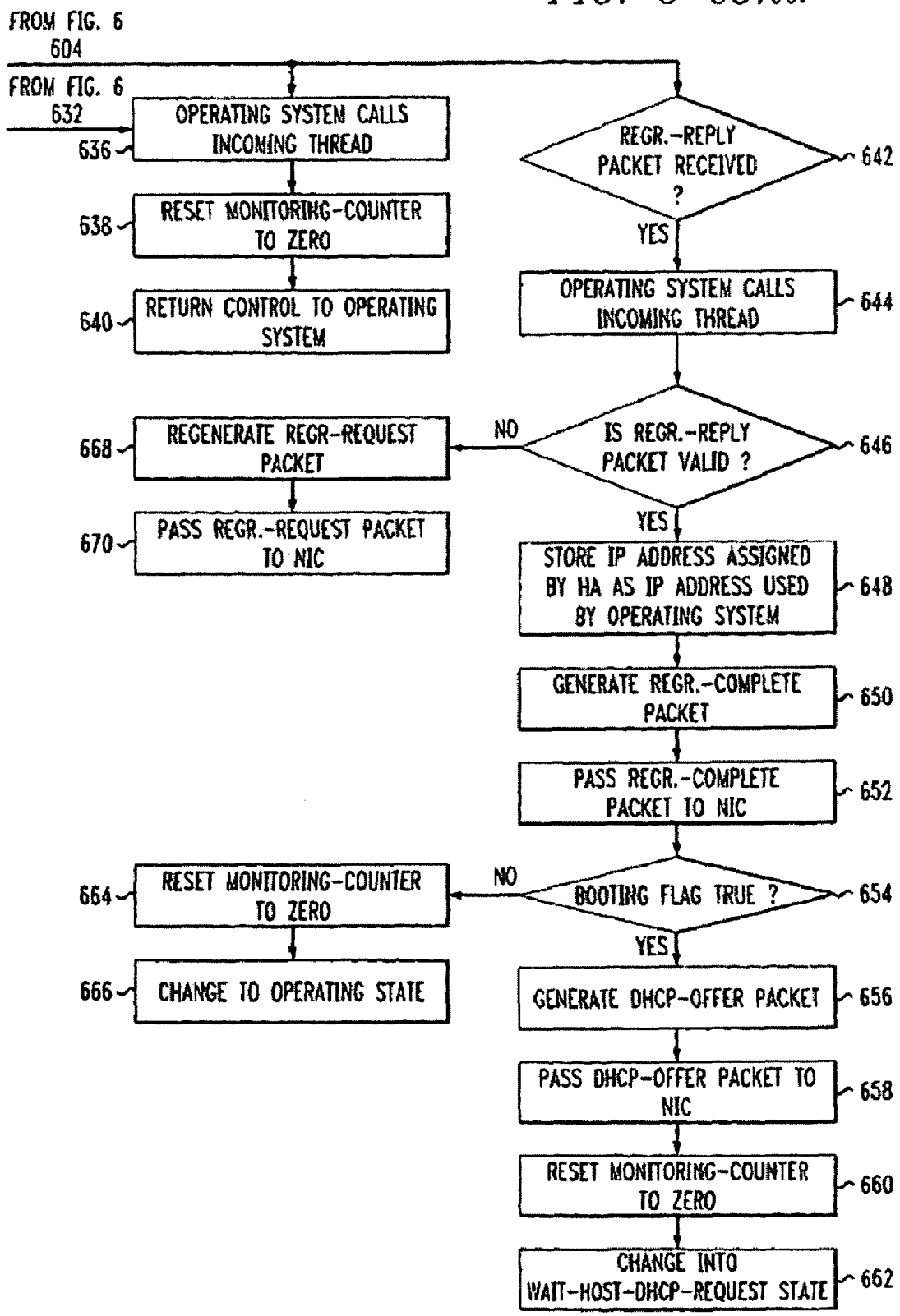

Referring now to FIG. 6, in the Wait-HA-REGR-Reply state identified at 600, the iDriver waits for the HA on a remote network to send back a Registration-Reply packet in response to a Registration-Request packet from the MH. In the interim, the iDriver monitors the local access network based on the value of the Monitoring-Counter. The waited events in this state include an incoming Registration-Reply packet, an incoming ARP-Reply packet, and a time-out event at 602. If the associated system timer times out in this state (which means the iDriver has not received the expected Registration-Reply packet within 100 ms), Windows@ calls the time-out thread at 606. The time-out thread then carries out the following instant actions. First, if the Monitoring-Counter equals a Changing-Access-Threshold (which means the MH may have moved into another local access network), the Monitoring-Counter is increased by one at 608. If the number of time-outs reaches a HA-Down-Threshold at 611 and if the Monitoring Counter has not reached the Changing-Access-Threshold at 610, the HA is down. In this case, the iDriver either: (1) returns the local IP address to WindowsB so that the operating system can continue to initialize the network interface without mobility support; or (2) keeps sending Registration-Request packets to the HA until the HA is up or WindowsB times out at 614. A DHCP-Discover packet is then generated at 616 with 0.0.0.0 as the source IP address and 255.255.255.255 as the destination IP address. This packet is passed to the underlying NIC driver at 618, which in turn broadcasts the packet on the local access network. The iDriver then changes into the Wait-Local-DHCP-Offer state at 620. The iDriver then returns control to the operating system at 622. If the Monitoring-Counter doesn't reach the Changing-Access-Threshold at 610, the time-out thread regenerates the Registration-Request packet at 624, and passes it to the underlying NIC driver at 626. The NIC driver sends the packet to the default gateway router using the router's MAC address as the destination MAC address. The time-out thread then generates a unicast ARP-Request packet at 628 with the care-of IP address as the source IP address. This packet is passed to the underlying NIC driver at 630, which in turn sends it to the default gateway router. As explained above, this allows for monitoring the local access network. If the iDriver does not receive the ARP-Reply packet at 632 from the default gateway router after sending a number of unicast ARP-Request packets, the MH may have moved into the coverage of another local access network. A unicast ARP-Request packet is communicated in lieu of a broadcast ARP-Request packet at 634 to avoid interrupting every node except the default gateway router on the local access network.

The time-out thread then returns control back to Windows@ at 622. If an ARP-Reply packet is received from the default gateway router in this state (which is the response to the ARP-Request packet that was previously sent out for the purpose of monitoring the local access network), at 636 WindowsB calls the incoming thread, which then resets the Monitoring Counter to zero at 638. The iDriver returns control to Windows@ at 640. If a Registration-Reply packet is received from the HA in this state at 642, WindowsB calls the incoming thread at 644. The iDriver then validates the Registration-Reply packet received from the access network. This packet contains an Authentication-Response message, an Authentication-Challenge message, and a Key-Exchange-Response message. If the HA correctly responds to the iDriver's Authentication-Challenge message that was previously sent to the HA in the Registration-Request packet, the iDriver stores the IP address assigned by the HA as the IP address used by Windows@ at 648. The iDriver then generates a Registration-Complete packet at 650 with its care-of IP address as the source IP address and the HA's IP address as the destination IP address. This packet is passed to the underlying NIC driver at 652, which in turn sends it to the default gateway router using the router's MAC address as the destination MAC address. If the Booting-Flag is True at 654, the iDriver also generates a DHCP-Offer packet at 656 with the HA's IP address as the source IP address and the IP address assigned by the HA as the destination address. This packet is passed to the overlying IP stack in Windows@ at 658. The iDriver then resets the Monitoring-Counter to zero at 660, and changes into the Wait-Host-DHCP-Request state at 662. If the Booting-Flag is False at 654, the iDriver resets the Monitoring-Counter to zero at 664, and changes into the Operating state at 666. If the HA replies with an incorrect response to the iDriverYs Authentication-Challenge message at 646, the iDriver regenerates the Registration-Request packet at 668 and passes it to the underlying NIC driver at 670. The NIC driver then sends the packet to the default gateway router. The incoming thread then returns control back to Windows@. The Registration-Complete packet includes a MH ID and an Authentication-Response message containing the iDriverYs response to the HA's Authentication-Challenge message received by the MH from the HA in the Registration-Reply packet.

Figure 7:
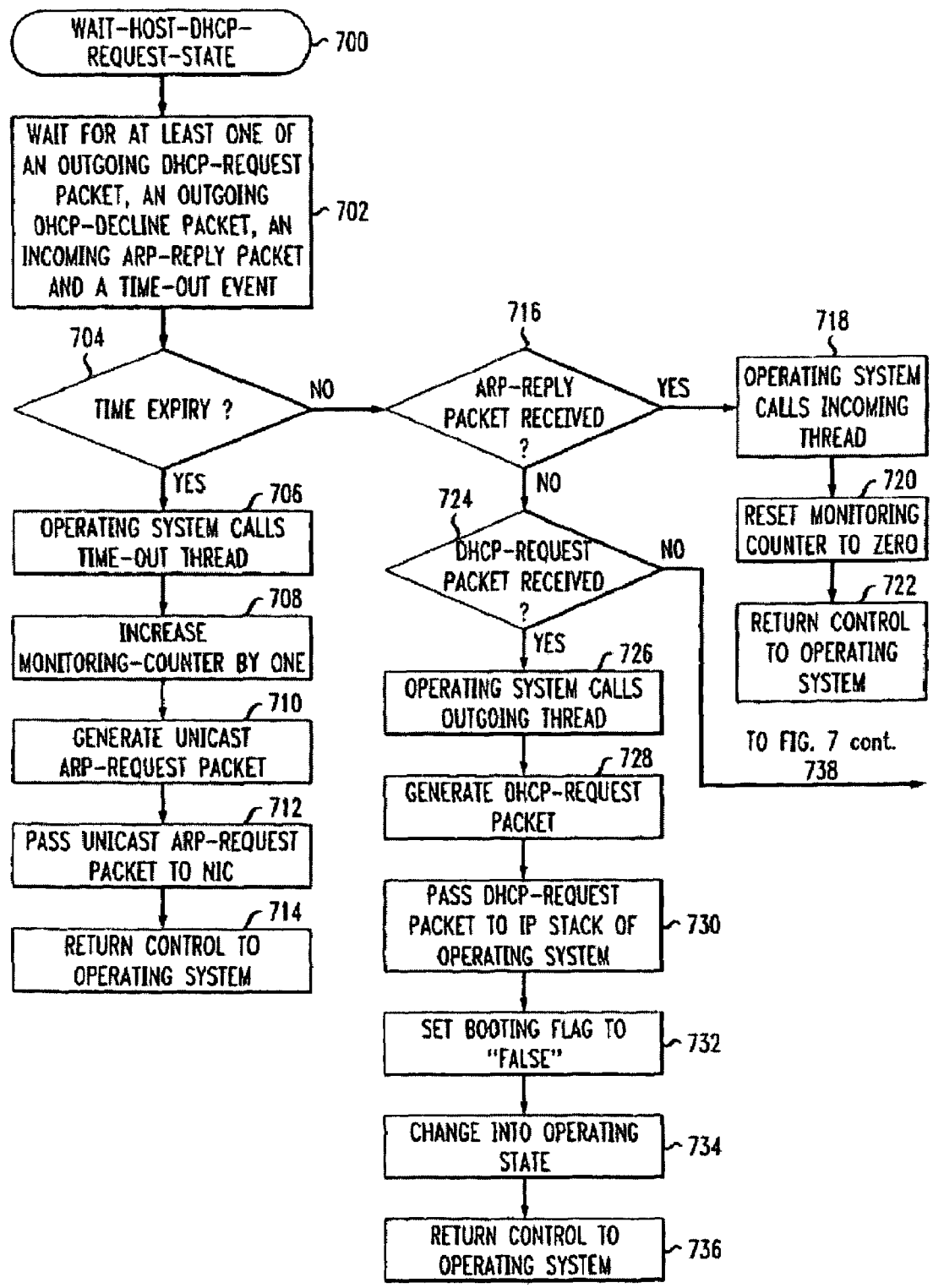
FIG. 7 is a flow diagram of a Wait-Host-DHCP-Request state (transient state).
Figure 7:
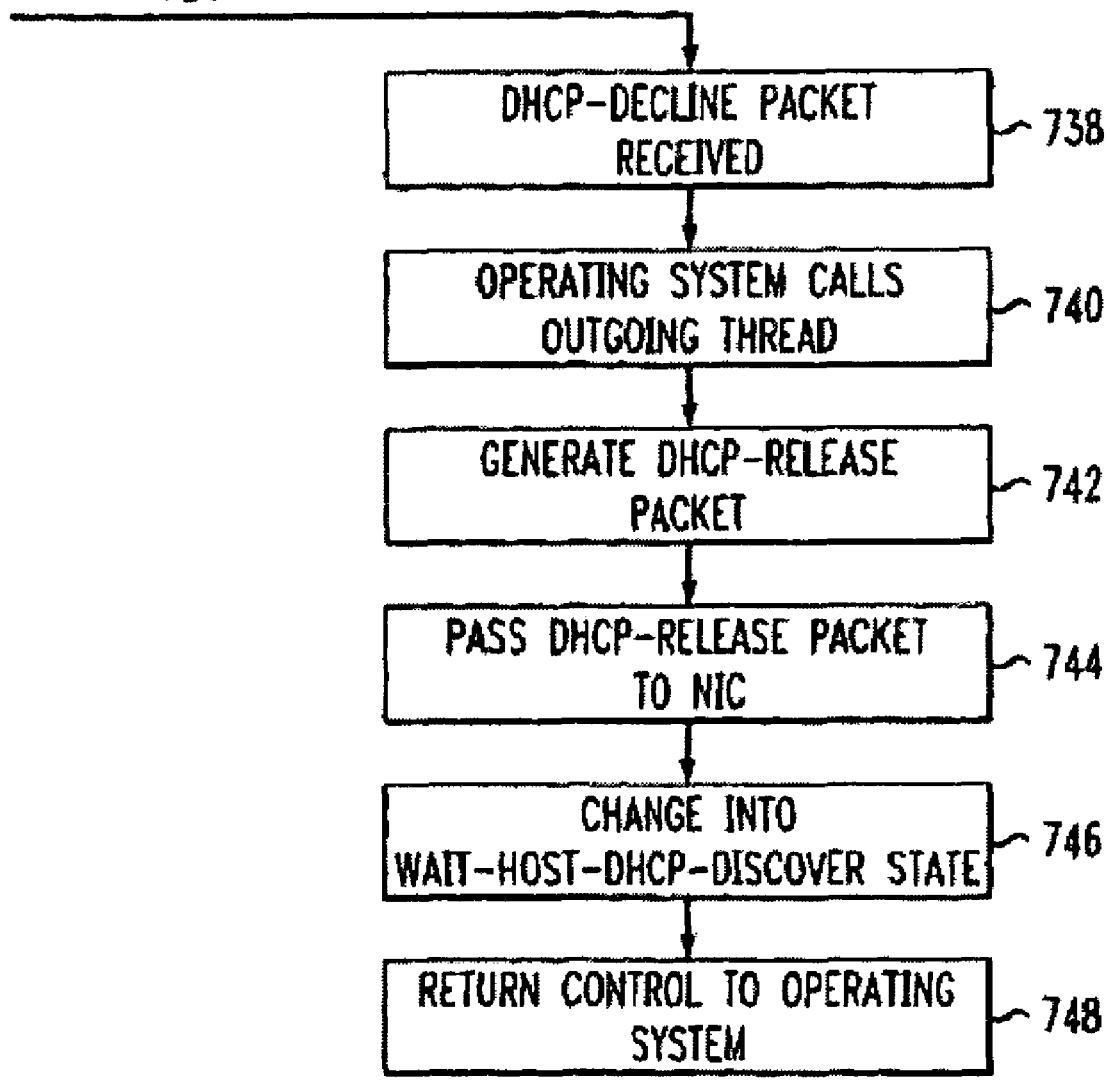

Referring now to FIG. 7, in the Wait-Host-DHCP-Request state 700, the iDriver waits for WindowsO to send out a DHCP-Request message or DHCP-Decline message. In the interim, the iDriver monitors the local access network. The waited events in this state include at least one of an outgoing DHCP-Request packet, an outgoing DHCP-Decline packet, an incoming ARP Reply packet, and a time-out event at 702. If the associated system timer times out in this state at 704, the operating system calls the time-out thread at 706. The time-out thread then carries out the following instant actions. Initially, the Monitoring-Counter is increased by one at 708 (even if the Monitoring-Counter reaches the Changing-Access-Threshold, the time-out thread does not change the state). The iDriver then generates a unicast ARP-Request packet at 710 with the care-of IP address as the source IP address. This packet is passed to the NIC driver at 712, which in turn sends it to the default gateway router on the local access network. The time-out thread then returns control back to Windows@ at 714. If an ARP-Reply packet is received from the default gateway router in this state at 716 (which is the response to the ARP-Request packet that was sent out for the purpose of monitoring the local access network) Windows@ calls the incoming thread at 718, which resets the Monitoring-Counter to zero at 720, and returns control back to Windows@ at 722. If a DHCP-Request packet is received from Windows@ in this state at 724, Windows@ calls the outgoing thread at 726, and the outgoing thread generates a DHCP-Ack packet at 728 with the HA's IP address as the source IP address and the IP address assigned by the HA as the destination address, passes it to the overlying IP stack of Windows at 730, sets the Booting-Flag to False at 732, and changes into Operating state at 734. The outgoing thread then returns control back to Windows@ at 736. If at 738 a DHCP Decline packet is received from WindowsO (i.e., Windows@ rejected the IP address assigned by the HA and wants to restart the DHCP process), Windows03 calls the outgoing thread at 740. The outgoing thread then generates a DHCPRelease packet at 742 with the care-of IP address as the source IP address, passes the packet to the underlying NIC driver at 744 (which in turn sends it to the DHCP server on the local access network to release the care-of IP address), and changes into the Wait-Host-DHCP-Discover state at 746. The outgoing thread then returns control back to Windows@ at 748.

Figure 8:
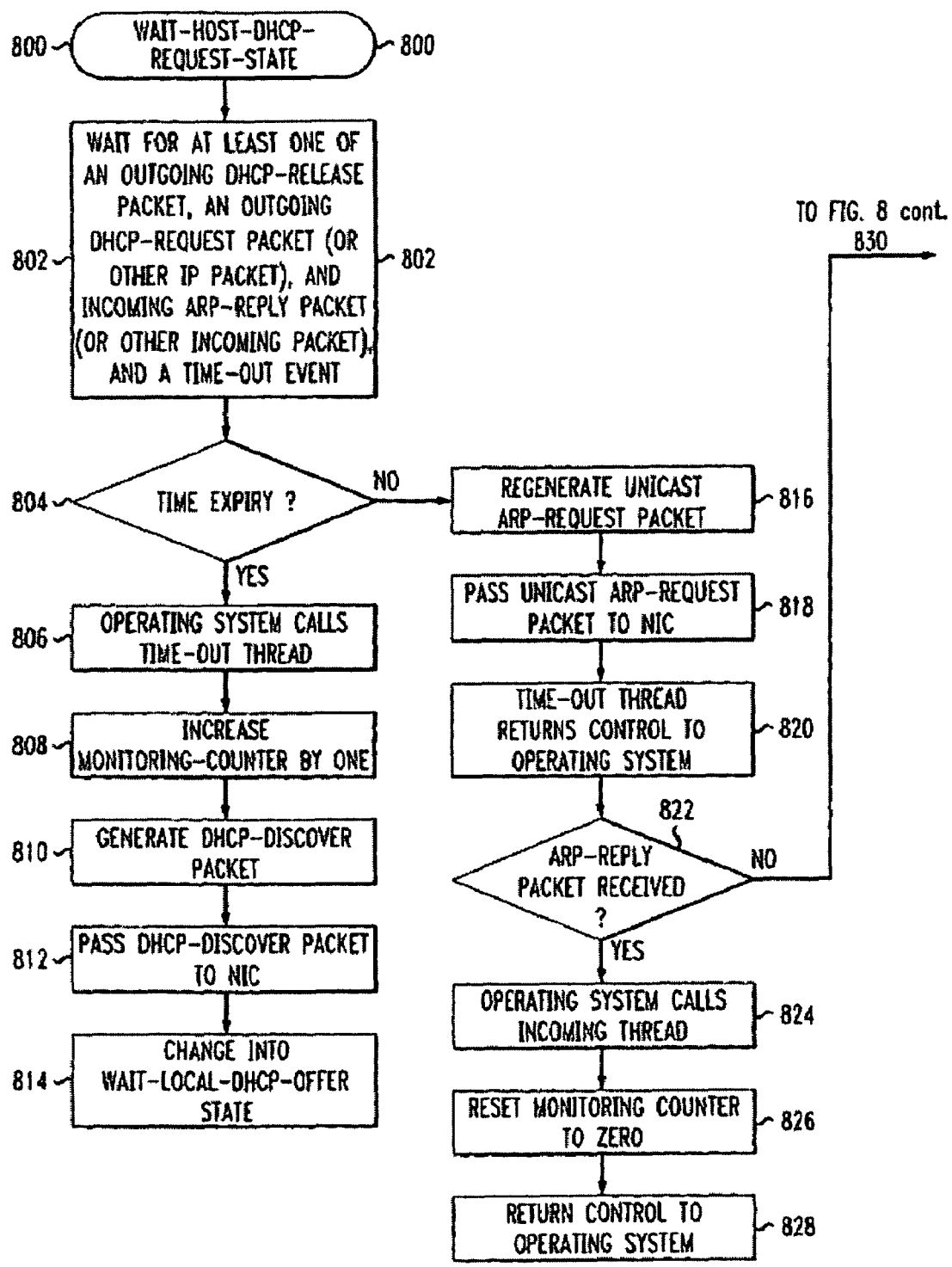
FIG. 8 is a flow diagram of an Operating state (common state).
Figure 8:
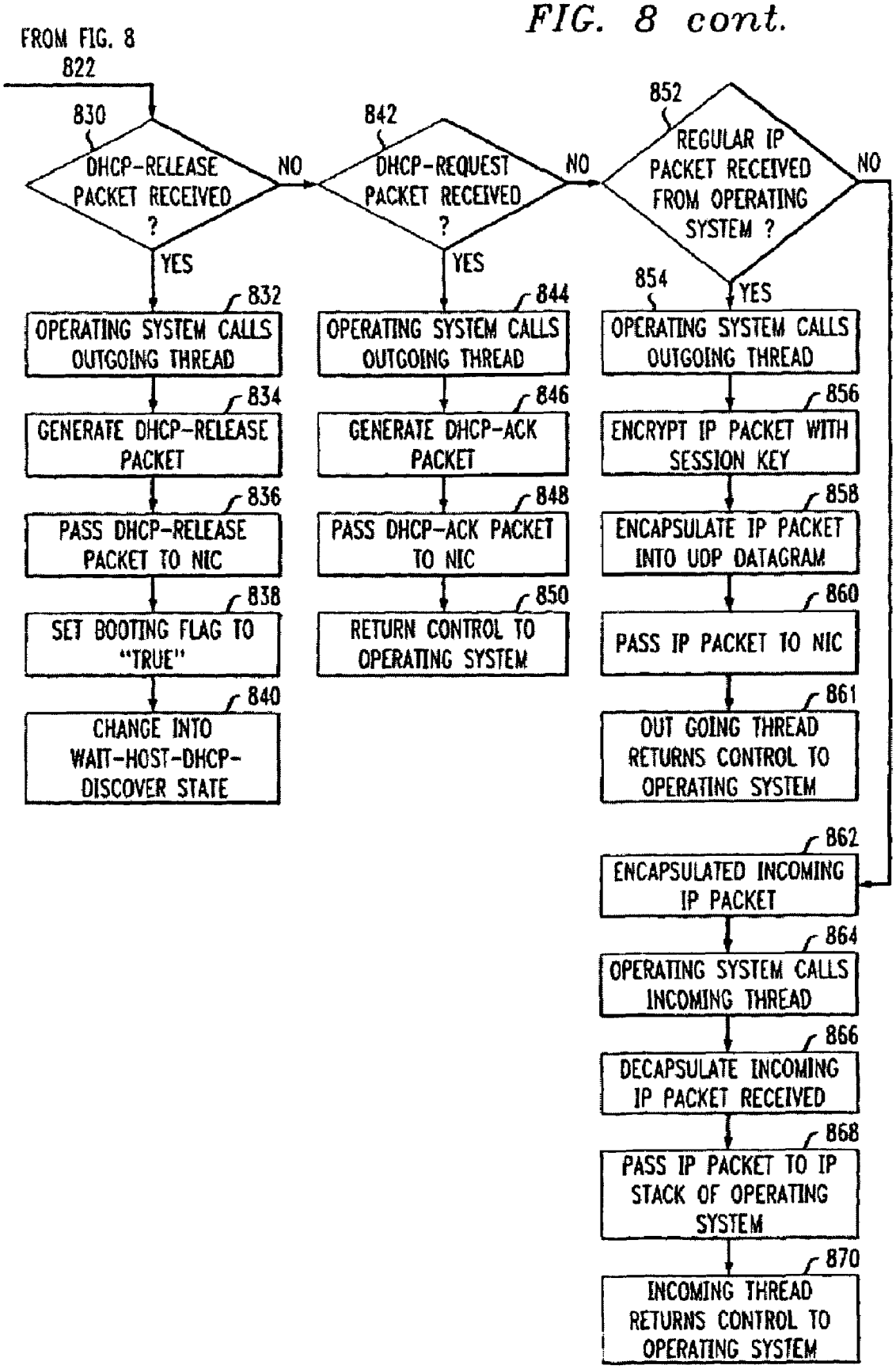
Figure 9:
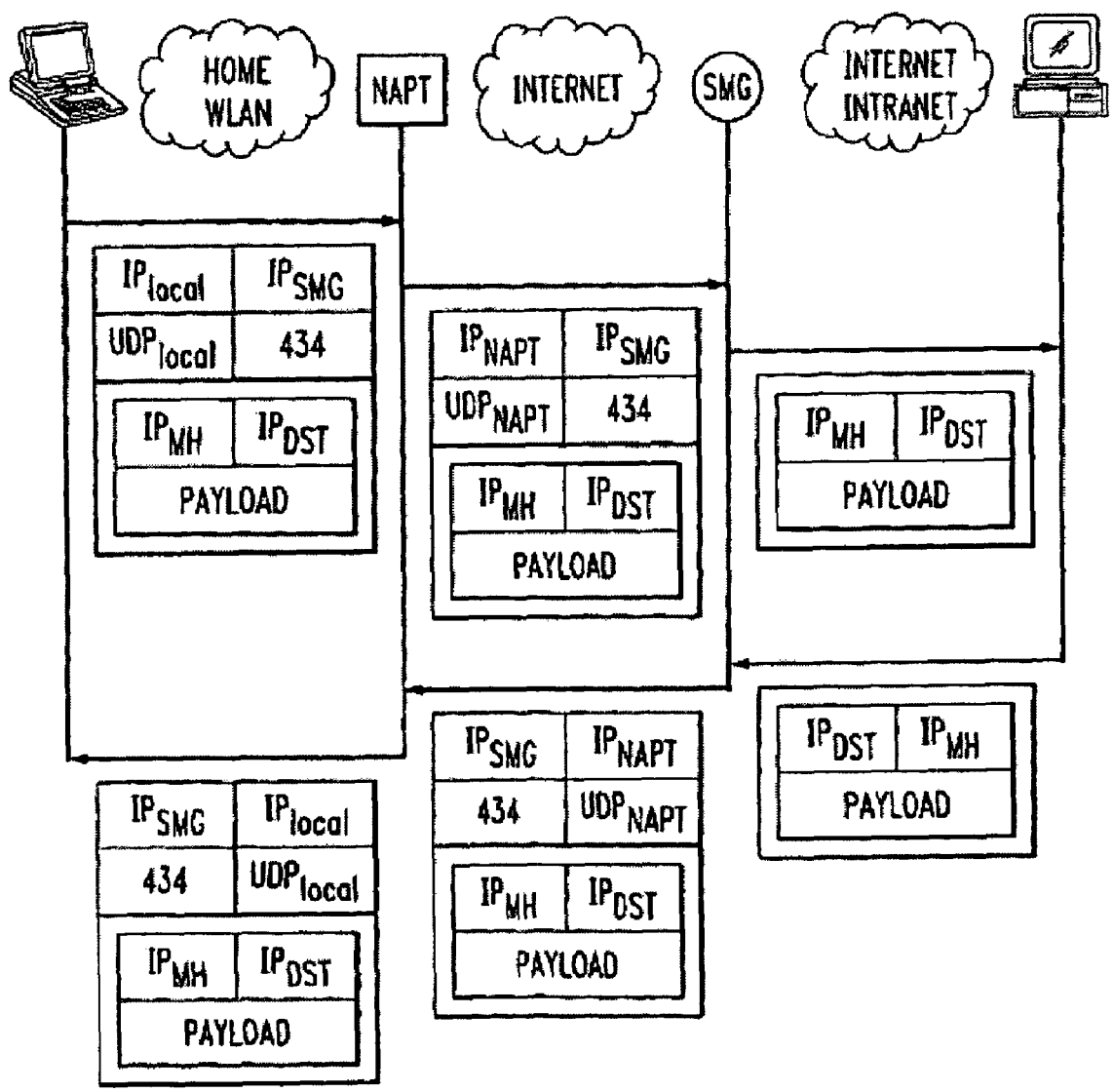
FIG. 9 is a schematic diagram of tunneling IP packets inside UDP datagrams in order to cross a NAPT box.

Referring now to FIG. 8, in the Operating state 800 the iDriver receives outgoing IP packets from Windows@, encapsulates the IP packets, and tunnels them to the HA. The iDriver also receives tunneled IP packets from the HA, decapsulates them into regular IP packets, and sends them to Windows@. In the interim, the iDriver monitors the local access network and implements handoff functions as required. The waited events in this state include at least one of an outgoing DHCP-Release packet, an outgoing DHCP-Request message, any other outgoing IP packet, an incoming ARP-Reply message, any other incoming IP packet, and a time-out event at 802. If the associated system timer times out in this state at 804, Windows@ calls the time-out thread at 806, which increases the Monitoring-Counter by one at 808 if the Monitoring-Counter equals a Changing-Access-Threshold (which means the MH may have moved into another local access network). The incoming thread then generates a DHCP-Discover packet at 810 with 0.0.0.0 as the source IP address and 255.255.255.255 as the destination IP address, passes the packet to the underlying NIC driver at 812 (which in turn broadcasts this packet on the local access network), and changes into the Wait-Local-DHCP-Offer state at 814. If the system timer has not timed out at 804, the time-out thread regenerates a unicast ARP-Request packet at 816 with the care-of IP address as the source IP address, and passes this packet to the underlying NIC driver at 818 (which in turn sends it to the default gateway router). The time-out thread then returns control back to Windows@ at 820. If at 822 an ARP-Reply packet is received from the default gateway router in this state (in response to the ARP-Request packet sent by the iDriver for the purpose of monitoring the local access network), Windows@ then calls the incoming thread at 824. The incoming thread resets the Monitoring Counter to zero at 826, and returns control back to Windows@ at 828. If a DHCP-Release packet is received from Windows@ in this state at 830 (which means that Windows@ wants to shut down the network interface), Windows@ calls the outgoing thread at 832. The outgoing thread then generates a DHCP-Release packet at 834 with the care-of IP address as the source IP address, passes the packet to the underlying NIC driver at 836, (which in turn sends it to the DHCP server on the local access network to release the care-of IP address), sets the Booting-Flag to True at 838, and changes into the Wait-Host-DHCP-Discover state at 840. If a DHCP-Request packet is received from Windows@ in this state at 842 (which means Windows wants to renew the lease of the assigned IP address), Windows@ calls the outgoing thread at 844. The outgoing thread then generates a DHCP-Ack packet at 846 with the HA's IP address as the source IP address and the IP address assigned by the HA as the destination address, passes the packet to the overlying IP stack of WindowsO at 848, and then returns control back to Windows@ at 850. If a regular IP packet is received from WindowsO in this state at 852, WindowsB calls the outgoing thread at 854. The outgoing thread then encrypts the IP packet using the session key at 856, encapsulates the packet into a UDP datagram with the care-of IP address as the source IP address at 858, and passes it to the underlying NIC driver at 860, which in turn tunnels it to the HAys UDP port 434. The outgoing thread then returns control back to Windows@ at 861. When encapsulated incoming IP packets are received from the HA at 862, WindowsB calls the incoming thread at 864, which decapsulates the IP packet at 866, decrypts it using the session key at 868, and passes it to the overlying IP stack of Windows@ at 870. The incoming thread then returns control back to Windows. IP packets are encapsulated in UDP datagrams to enable the packets to pass NAPT boxes that are popular in home network environments, such as illustrated in FIG. 9. NAPT boxes are known in the art as shown and described in, for example, P. Srisuresh and K. Egevang, "Traditional IP Network Address Translator (Traditional NAT)", IETF RFC3022, January 2001, the content of which is incorporated by reference herein. The present invention has been shown and described in what are considered to be the most practical and preferred embodiments. It is anticipated, however, that obvious modifications may be implemented by those skilled in the art.

A program code listing is attached in text format as Appendix A.

While these embodiments have been described with emphasis on the embodiments, it should be understood that within the scope of the appended claims, the embodiments might be practiced other than as specifically described herein.

What is claimed is:

1. A method for processing internetworking protocols for a host computer with another computer on a remote network by incorporating a state machine with a network interface driver, wherein the network interface driver is configured to have a plurality of states, each state is associated with a plurality of threads and waited events wherein the method for processing internetworking protocols comprises the steps of:
   a. processing outgoing packets from an operating system associated with the host computer in at least one of the plurality of states;
   b. processing incoming packets to an access network in at least one of the plurality of states; and
   c. processing at least one of a plurality of time-out events in at least one of the plurality of states; wherein the processing steps are instant actions, comprising generating a new packet and sending the new packet to the operating system or the access network; dropping the new packet received from the operating system or the access network; revising a content of the new packet received from the operating system, forming a revised packet; and sending the revised packet to the operating system or the access network; registering a time-out event with the operating system; and changing the state of the network interface driver;
   d. and wherein the network interface driver is configured as a seven state machine, including a Wait-Host-DHCP-Discover State; a Wait-Local-DHCP-Offer State; a Wait-Local-DHCP-Ack State; a Wait-Router-ARP-Reply State; a Wait-HA-Registration-Reply State; a Wait-Host-DHCP-Request State; and an Operating State.

2. The method of claim 1, wherein the network interface driver:
   obtains a care-of IP address from the access network;
   establishes an IP tunnel with a remote home agent with the care-of IP address;
   encapsulates IP packets that are communicated to the access network; and
   decapsulates IP packets destined from the host computer.

3. The method of claim 2, wherein the network interface driver identifies a type of local access network.

4. The method of claim 1, wherein a response to a time out thread called by the operating system, causes the network interface driver to:
   regenerate a DHCP-Discover packet;
   pass the DHCP-Discover packet to a network interface card driver; and
   return control to the operating system.

5. The method of claim 1, wherein upon receipt of a DCHP-Offer packet from the access network and an incoming thread called by the operating system, the network interface driver:
- stores and assigns IP address as a care-of IP address in host memory;
- generates a DHCP-Request packet with the care-of IP address as a source IP address;
- passes the DHCP-Request packet to a network interface card driver;
- resets a Monitoring-Counter to zero;
- returns control to the operating system.

6. The method of claim 5, wherein when a Monitoring-Counter equals a Changing-Access-Threshold, the network interface driver:
- generates a DHCP-Discover packet;
- passes the DHCP-Discover packet to the network interface card driver;
- returns to Wait-Local-DHCP-Offer states, and
- returns control to the operating system.

7. The method of claim 5, wherein if a DCHP-Ack packet is received from a local access network, the network interface driver:
- generates an ARP-Request packet with a care-of IP address as a source IP address;
- passes the ARP-Request packet to the network interface card driver;
- resets a Monitoring-Counter to zero, and
- changes into a Wait-Router-ARP-Reply State.

8. The method of claim 7, wherein if the Monitoring-Counter equals a Changing-Access-Threshold, the network interface driver:
- generates a DHCP-Discover packet;
- passes the DHCP-Discover packet to the network interface card driver; and
- changes into a Wait-Local-DHCP-Offer State.

9. The method of claim 7, wherein if the Monitoring-Counter does not equal a Changing-Access-Threshold, the network interface driver:
- generates a ARP-Request packet;
- passes the ARP-Request packet to the network interface card driver, and
- returns control to the operating system.

10. The method of claim 7, wherein in response to receipt of an ARP-Reply packet from a local access network and an incoming thread being called by the operating system, the network interface driver:
- generates a Registration-Request packet with a care of IP address identical to a source IP address and an IP address of a home agent as a destination IP address;
- passes the Registration-Request packet to the network interface card driver;
- resets the Monitoring-counter to zero;
- changes into a Wait-RA-REGR-Reply State; and
- returns control to the operating system.

11. The method of claim 10, wherein in response to a time-out thread being called by the operating system, the network interface driver:
- generates a DHCP-Discover packet;
- passes the DHCP-Discover packet to the network interface card driver; and
- changes into a Wait-Local-DHCP-Offer State.

12. The method of claim 11, wherein response to a time-out thread being called by the operating system, the network interface driver:
- regenerates a Registration Request packet;
- passes the Registration Request packet to the network interface card driver;
- generates a unicast ARP-Request packet with a care of IP address as a source IP address;
- passes the unicast ARP-Request packet to the network interface card driver; and
- returns control to the operating system.

13. The method of claim 12, wherein response to an incoming Registration-Reply packet, the network interface driver:
- validates the incoming Registration-Reply packet;
- generates a Registration-Complete packet with a care-of IP address as a source IP address and an IP address of a home agent as a destination IP address; and
- passes the Registration-Complete packet to the network interface card driver.

14. The method of claim 13, wherein if a Booting-Flag is True, the network interface driver:
- generates a DHCP-Offer packet with a home agent's IP address as a source IP address, and an IP address assigned by the home agent as a destination IP address;
- passes the DHCP-Offer packet to an IP stack in the operating system;
- resets a Monitoring-Counter to zero; and
- changes into a Wait-Host DHCP-Request state.

15. The method of claim 13, wherein if a Booting-Flag is False, the network interface driver:
- resets a Monitoring-Counter to zero; and
- changes into an Operating state.

16. The method of claim 14, wherein upon a time-out thread being called by the operating system, the network interface driver:
- advances a Monitoring-Counter by one;
- generates a unicast ARP-Request message with a care-of IP address as a source IP address;
- passes the unicast ARP-Request message to the network interface card driver; and
- returns control to the operating system.

17. The method of claim 14, wherein response to an incoming DHCP-Request packet from the operating system, the network interface driver:
- generates a DHCP-Ack packet with a home agent's IP address as a source IP address and an IP address assigned by the home agent as a destination address;
- passes the DHCP-Ack packet to an IP stack of the operating system;
- sets a Booting-Flag to False;
- changes into an Operating state; and
- returns control to the operating system.

18. The method of claim 17, wherein response to an incoming DHCP-Decline packet from the operating system, the network interface driver:
- generates a DHCP-Release packet with a care-of IP address as a source IP address;
- passes the DHCP-Release packet to the network interface card driver;
- changes into a Wait-Host-DHCP Discover state; and
- returns control to the operating system.

* * * * *

UNITED STATES PATENT AND TRADEMARK OFFICE
CERTIFICATE OF CORRECTION

PATENT NO. : 7,546,385 B1
APPLICATION NO. : 11/216794
DATED : June 9, 2009
INVENTOR(S) : Henry et al.

Page 1 of 1

It is certified that error appears in the above-identified patent and that said Letters Patent is hereby corrected as shown below:

Column 13, lines 10 and 11 (claim 5): after the line ending in "zero;"and before the line beginning with "returns" insert the line --changes into the Wait-Local-DHCP-Offer Ack State; and--

Column 13, line 54 (claim 10): replace "Wait-RA-REGR-Reply" with --Wait-HA-REGR-Reply--

Signed and Sealed this
Fourteenth Day of August, 2012

David J. Kappos
*Director of the United States Patent and Trademark Office*